United States Patent
Tatamiya (10) Patent No.: US 6,850,283 B1
(45) Date of Patent: Feb. 1, 2005

(54) CAMERA AND MOBILE EQUIPMENT USING MOBILE MEMORY

(75) Inventor: Hisashi Tatamiya, Saitama (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 10/408,309

(22) Filed: Apr. 8, 2003

(30) Foreign Application Priority Data

Apr. 9, 2002 (JP) .................................... P2002-106349

(51) Int. Cl.⁷ ............................................. H04N 5/225
(52) U.S. Cl. ..................................................... 348/373
(58) Field of Search ........................... 348/373, 231.99, 348/231.7, 374, 375, 376, 231.8

(56) References Cited

U.S. PATENT DOCUMENTS

| | | | |
|---|---|---|---|
| 6,421,247 B1 | | 7/2002 | Fuchimukai |
| 2001/0006401 A1 | * | 7/2001 | Nakagawa et al. ......... 348/233 |
| 2001/0017664 A1 | * | 8/2001 | Misawa ...................... 348/373 |
| 2003/0011690 A1 | * | 1/2003 | Uryu ....................... 348/231.7 |
| 2003/0095194 A1 | * | 5/2003 | Suzuki et al. .......... 348/231.99 |

FOREIGN PATENT DOCUMENTS

JP        2002236884        8/2002

OTHER PUBLICATIONS

English Language Translation of JP Appln. No. 2002–236884.

* cited by examiner

*Primary Examiner*—Vu Le
*Assistant Examiner*—N. Hernandez
(74) *Attorney, Agent, or Firm*—Greenblum & Bernstein, P.L.C.

(57) ABSTRACT

A camera, using a mobile memory and a special mobile member, has an installing portion and a covering member. The special mobile member has a special portion for accomplishing a special function different from a data-storing function, and the installed portion of the special mobile member has a size that is the same as that of the installed portion of the mobile memory. The installing portion has a first-opening for detachably installing the mobile memory and the special mobile member. The covering member is capable of covering the mobile memory installed in the first-opening. The covering member has a first cover and a second cover. The first cover has a second-opening, which has a size corresponding to the size of the first-opening, and opens and closes when installing the mobile memory. The second cover closes the second-opening, and opens to install the special mobile member into the first-opening. When the second cover is opened in accordance with an installing-action of the special mobile member, the first cover is closed.

11 Claims, 6 Drawing Sheets

CAMERA AND MOBILE EQUIPMENT USING MOBILE MEMORY

BACKGROUND OF THE INVENTION

1. Field of the Invention

The present invention relates to a camera and mobile equipment, such as a PDA (Personal Digital Assistant), a mobile telephone, and so on, in which a mobile memory is detachably installed. Especially, it relates to an installing-mechanism of a camera and other mobile equipment.

2. Description of the Related Art

In the case of a camera and mobile equipment, a card type memory, such as a Compact Flash (Registered Trademark) an SD (Secure Digital) card (Registered Trademark), and so on, can be installed into camera/mobile equipment. As the camera and mobile equipment is occasionally used outdoors, therefore a cover member is provided for protecting the memory card; especially, for protecting the memory card from dust. When the memory card is installed, the cover member is closed so as to cover the memory card.

In recent years, special cards with special functions, such as a scanner, wireless communication, or GPS (Global Positioning System), have been developed. The special card is constructed by attaching a special part with the special function to a card type member having a size that is the same as the size of the memory card.

When installing the special card, the cover member cannot be closed because the special part becomes an obstruction, so that dust attached to or collected on the installing portion and water can penetrate into the installing portion, resulting in damage to the camera and mobile equipment.

SUMMARY OF THE INVENTION

Therefore, an object of the present invention is to provide a camera and mobile equipment with a cover that is suitable for a mobile memory and a special mobile member such as a special card.

A camera according to the present invention is a camera using a mobile memory, such as a memory card, and a special mobile member with special functions, such as communication functions. For example, the camera is a digital still camera, or digital movie camera. The mobile memory is a detachable mobile memory, which can be installed in other mobile equipment, such as a PDA, mobile computer, a mobile telephone, and so on, in addition to the camera. On the other hand, the special mobile member has a special portion for accomplishing a special function different from data-storing. The installed portion of the special mobile member has a size that is the same as the installed portion of the mobile memory. For example, in the case of the memory card, the special mobile member is shaped like a card. The special mobile member has, for example, local/distance communication functions, or GPS functions. Note that, the special mobile member may have a memory function or not have the memory function. The total form of the special mobile member is different from the mobile memory due to the special portion with special functions.

The camera has an installing portion, and a covering member. The installing portion has a first-opening for detachably installing the mobile memory and the special mobile member. The covering member is capable of covering the mobile memory installed in the first-opening. Further, the covering member has a first cover and a second cover. The first cover has a second-opening, which has a size corresponding to the size of the first-opening, and opens and closes when installing the mobile memory. On the other hand, the second cover closes the second-opening, and opens when installing the special mobile member into the first-opening. At this time, in accordance with the installing-action of the special mobile member, the second cover opens in a situation where the first cover is closed.

Mobile equipment according to the present invention, using a mobile memory and a special mobile member, has an installing portion and a covering member. The special mobile member has a special portion for accomplishing a special function different from a data-storing function, and an installed portion that has the same size as the installed portion of the mobile memory. The installing portion has a first-opening for detachably installing the mobile memory and the special mobile member. The covering member is capable of covering the mobile memory installed in the first-opening. The covering member has a first cover and a second cover. The first cover has a second-opening having a size corresponding to the first-opening, and opens and closes when installing the mobile memory. The second cover closes the second-opening, and opens to install the special mobile member into the first-opening. At this time, the second cover opens in a situation where the first cover is closed, in accordance with the installing-action of the special mobile member.

An apparatus for installing a normal mobile member and a special mobile member according to another aspects of the present invention has an installing portion, and a covering member. The special mobile member has a special portion for accomplishing a special function different from a data-storing function. The installing portion has a first-opening for detachably installing the mobile memory and the special mobile member. The special portion protrudes from the installing portion when the special mobile member is installed into the first-opening. Then, the covering member covers the normal mobile member and the special mobile member. Namely, the covering member perfectly covers the normal mobile member when installing the normal mobile member, and covers the special mobile member except the special portion when installing the special mobile member.

BRIEF DESCRIPTION OF THE DRAWINGS

The present invention will be better understood from the description of the preferred embodiments of the invention set fourth below together with the accompanying drawings, in which.

DESCRIPTION OF THE PREFERRED EMBODIMENTS

Hereinafter, the preferred embodiments of the present invention are described with reference to the attached drawings.

Figure 1:
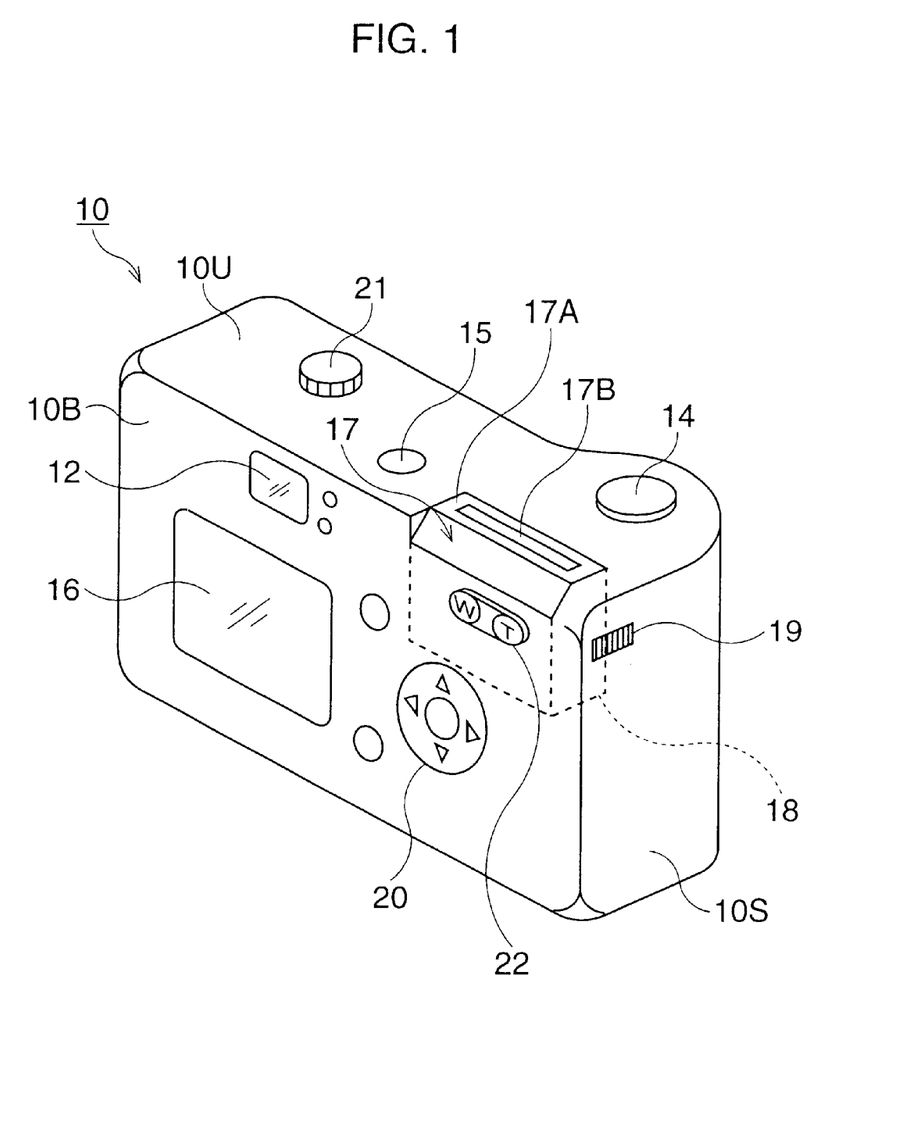
FIG. 1 is a perspective view of a digital camera seen from the rear, according to the first embodiment.

FIG. 1 is a perspective view of a digital camera seen from the rear, according to the first embodiment.

The digital camera 10 is a compact type digital still camera, and a memory card (herein, not shown) is installed into the digital camera 10 to record digital data, such as image-data, sound-data, and so on. An installing-portion 18 is provided in the upper and right side of the camera 10, seen from the rear of the camera 10. The memory card is installed into and detached from the installing-portion 18. A card-cover 17 for covering the installing-portion 18 is provided on the upper surface 10U, and is arranged so as to be opposite to the installing-portion 18. When the card-cover 17 is opened, the memory card can be installed into the installing-portion 18. The card-cover 17 is constructed of a main card-cover (first cover) 17A and an accompanying cover (second cover) 17B. A release button 14, a mode dial 21, and a power switch button 15 are provided on the upper surface 10U. A photographing-mode, a replay-mode, or an exposure-setting mode is selected by using the mode dial 21. In the case of the photographing-mode, a subject image is recorded by depressing the release button 14.

A lever 19 for opening the card-cover 17 is provided on a side surface 10S of the camera 10, and is operated when installing and detaching the memory card. A cross-typed setting button 20, a zoom button 22, an LCD (Liquid Crystal Display) 16, and a viewfinder 12 are provided on a back surface 10B. When the replay-mode is selected, a still image, which has been photographed, is displayed on the LCD 16. When the exposure-setting mode is selected, the setting button 20 is operated for setting an exposure conditions. The zoom button 22 is operated for zooming in on the subject being photographed.

Figure 2:
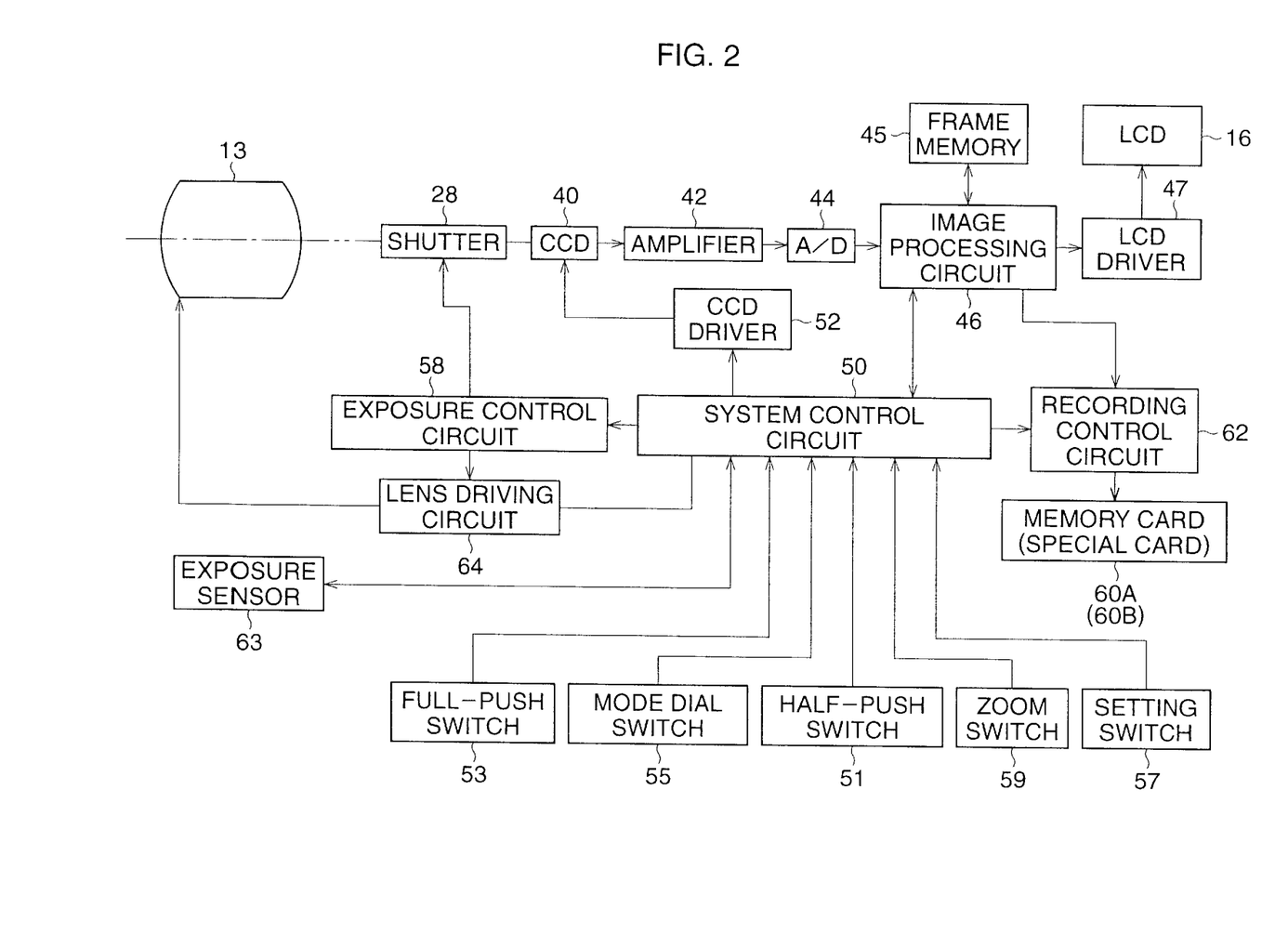
FIG. 2 is a block diagram of the digital camera.

FIG. 2 is a block diagram of the digital camera 10. A system control circuit 50 including a CPU (not shown) controls the digital camera 10, and a half-push switch 51, a full-push switch 53, a mode dial switch 55, a setting switch 57, and a zoom switch 59 are connected to the system control circuit 50. In the mode dial switch 55, a signal corresponding to the selected mode is output to the system control circuit 50. When the zoom button 22 or the setting button 20 is operated, an operation signal corresponding to the operated button is fed from the zoom switch 59 or the setting switch 57 to the system control circuit 50.

When the release button 14 is depressed halfway, half-push switch 51 is turned ON and the half-depression is detected. Thus, the brightness of the subject and the distance between the subject and the camera 10 are measured by an exposure sensor 63. Further, when the release button 14 is fully depressed, full-push switch 53 is turned ON, and the full-depression is detected. Consequently, the photographing action is performed. Namely, a focus lens included in a photographing optical system 13 is driven by a lens driving circuit 64 to adjust the focus point. Then, a shutter 28 opens by a predetermined amount in accordance with a control signal fed from an exposure control circuit 58, so that light passing the photographing optical system 13 reaches a CCD (Charge-Coupled Device) 40, and the subject image is formed on the CCD 40. The lens driving circuit 64 and the shutter 28 are controlled by the exposure control circuit 58, which outputs driving signals in accordance with control signals fed from the system control circuit 50. Analog image signals are generated in the CCD 40 by photoelectric effect, and are then read from the CCD 40 by a CCD driver 52. The read image signals are fed to an amplifier 42.

The analog image signals are amplified by the amplifier 42, and are then converted to digital image signals in an A/D converter 44. The digital image signals are fed to an image processing circuit 46, wherein various processes, such as a gamma correction, a gain control associated with a white balance adjustment, and so on, are performed for the digital image signals. The processed digital image signals are temporarily stored in a frame memory 45, and are then fed to a recording control circuit 62 via the system control circuit 50. The digital image signals are subjected to an image compressing process in the recording control circuit 62, and the compressed image signals are recorded in the memory card 60A as image-data.

As described later, a special card (IO card) 60B with a local communication function can be alternatively installed into the installing-portion 18. The special card 60B has a controller module with the local communication function, and an installed portion of the special card 60B has a size that is the same as the installed portion of the memory card 60A. When the special card 60B is installed into the installing-portion 18, the compressed image data is sent toward equipment with a receiving function, such as a mobile computer, mobile telephone, and so on. Herein, the local communication standard applied is the so called "Bluetooth".

When the replay-mode is selected by the mode dial 21 in a situation where the memory card 60A is installed, the compressed image-data is read from the memory card 60A, and then subjected to the image expanding process in the recording control circuit 62. The expanded image-data is temporarily stored in the frame memory 45, and sent to a LCD driver 47. The LCD driver 47 controls the LCD 16 in accordance with the image-data so that the recorded subject image is displayed on the LCD 16.

Figure 3:
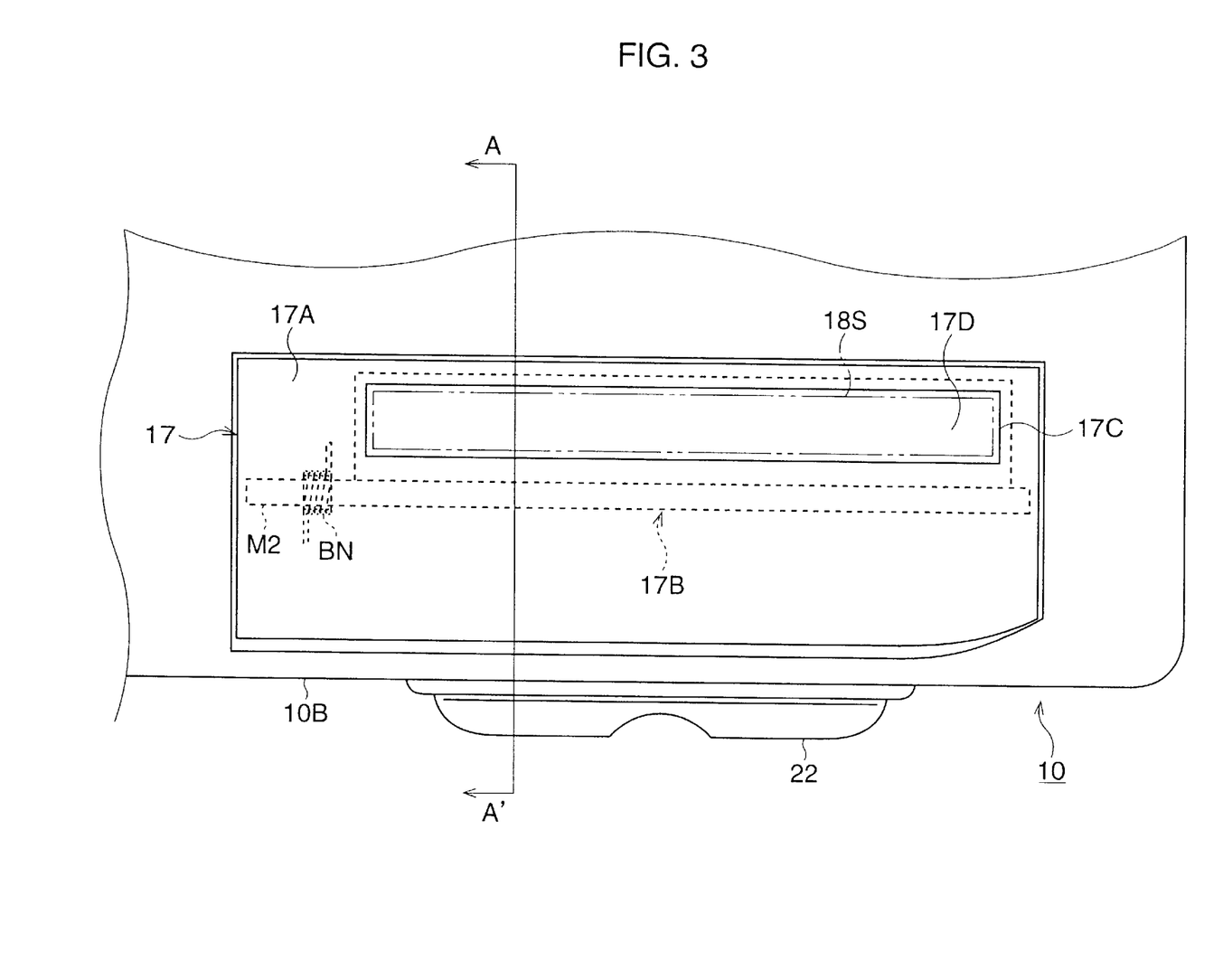
FIG. 3 is a plane view of a card-cover seen from the upper side.
Figure 4:
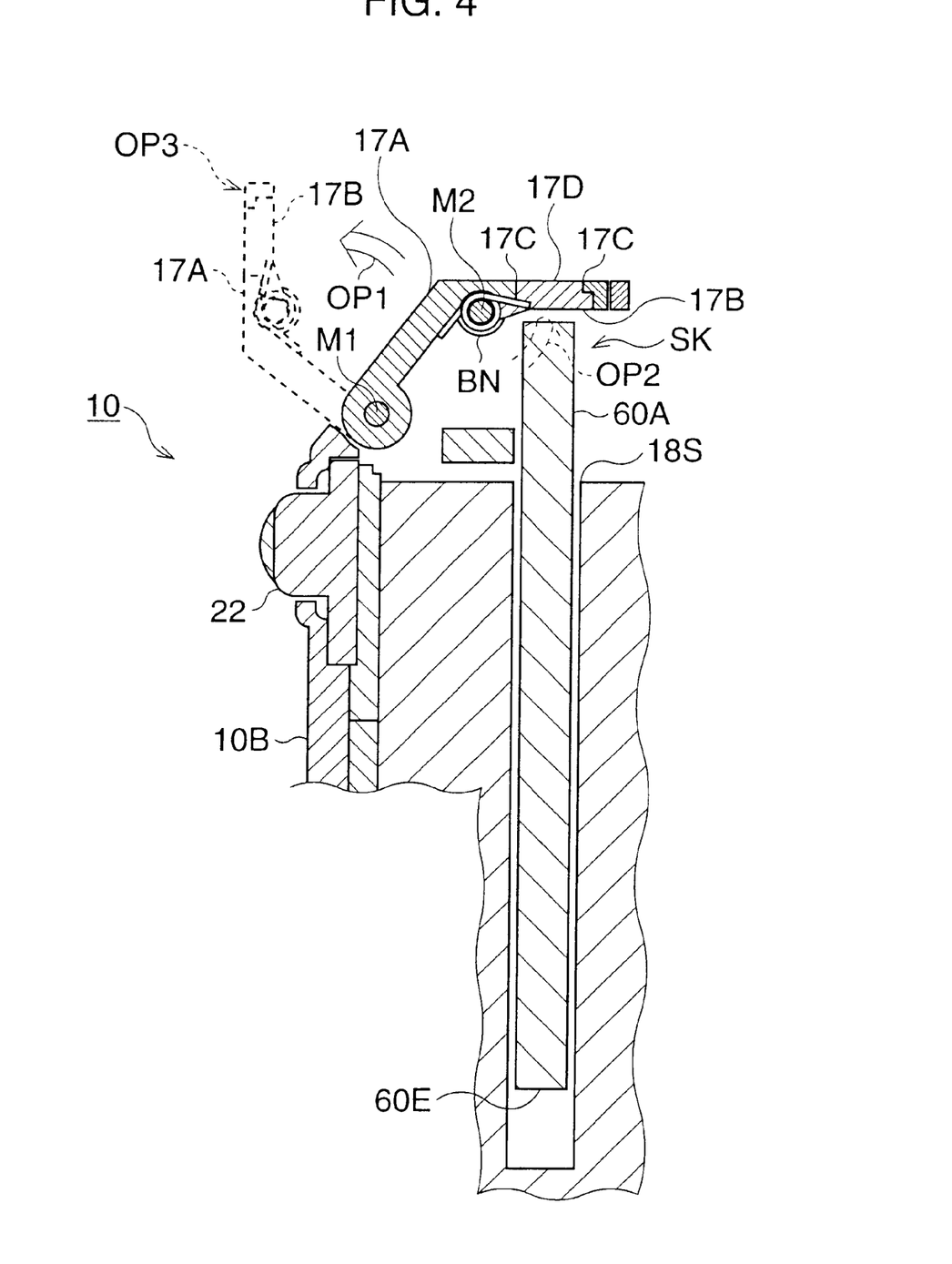
FIG. 4 is a schematic cross section view of an installing-portion along line A–A' in FIG. 3, in a situation where a memory card is installed.
Figure 5:
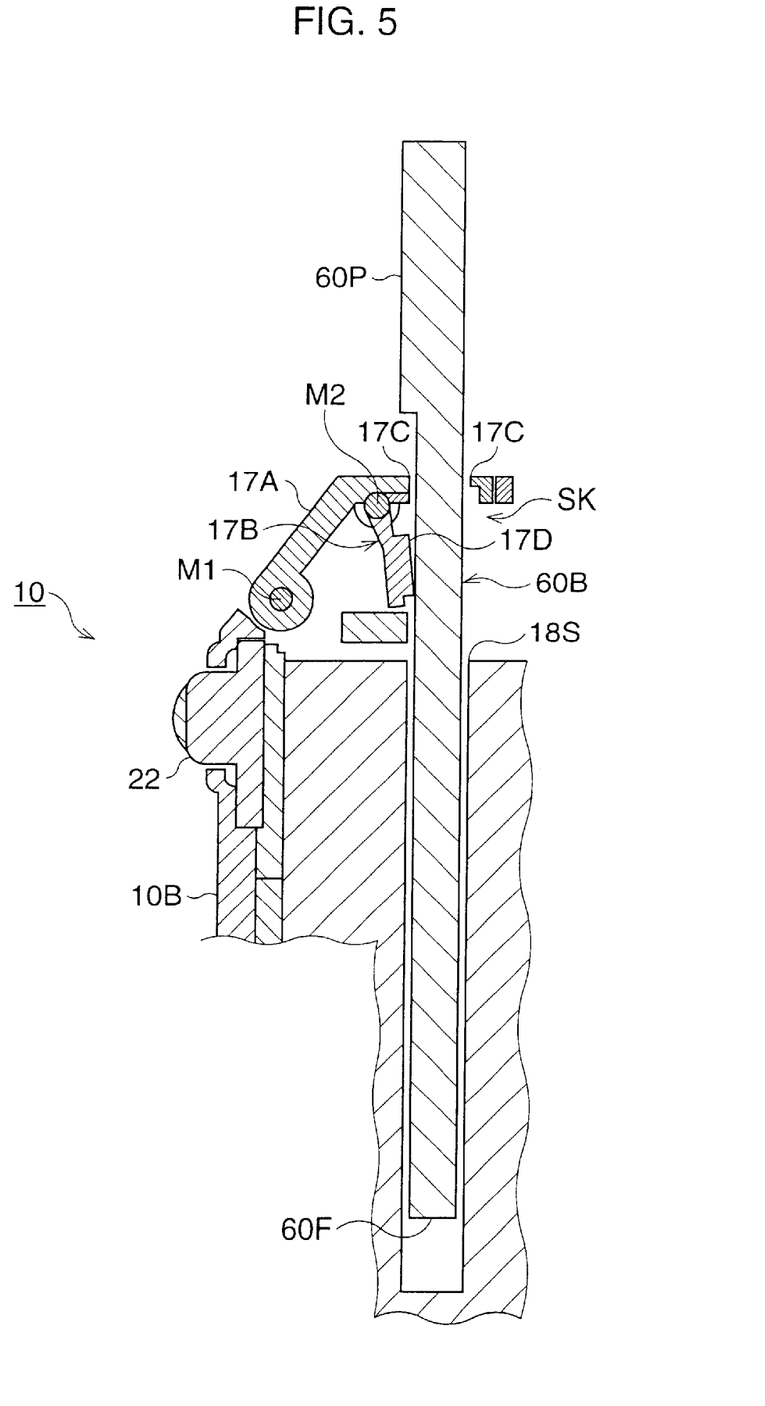
FIG. 5 is a schematic cross section view of the installing-portion in a situation where a special card is installed.

FIG. 3 is a plane view of the card-cover 17 seen from the upper side. FIG. 4 is a schematic cross section view of the installing-portion 18 along line A–A' in FIG. 3, in a situation where the memory card 60A is installed. FIG. 5 is a schematic cross section view of the installing-portion 18 in a situation where the special card 60B is installed.

The main card-cover 17 provided on the upper surface 10U opens and closes with the accompanying cover 17B by pivoting around a first rotating axis M1 shown in FIG. 4. The main card-cover 17A is urged toward an opening direction (shown by arrow OP1 in FIG. 4) by a rotating spring (not shown), however, the main card cover 17A is maintained in a closed situation by the lever 19 shown in FIG. 1. An opening-portion 17C is formed in the main card-cover 17A, and the accompanying cover 17B closes the opening-portion 17C. The size of the opening-portion 17C corresponds to a card-slot 18S in the installing-portion 18, and the opening-portion 17C is formed so as to be opposite to the card-slot 18S. The accompanying cover 17B has a spring BN, which is wound around a second rotating axis M2, and the accompanying cover 17B opens and closes by pivoting around the second rotating axis M2. The spring BN urges the accompanying cover 17B toward the closed-direction shown by a broken arrow OP2. Accordingly, the accompany cover 17B is maintained in the closed situation, as shown in FIGS. 3 and 4. A covering-portion 17D of the accompanying cover 17B has a size corresponding to the opening-portion 17C, and perfectly closes the opening-portion 17C when the accompanying cover 17B is closed.

The card slot 18S for installing the memory card 60A or the specific card 60B is formed behind the release button 14 seen from the back surface 10B of the camera 10. When the memory card 60A is installed into the card slot 18S, the end portion 60E of the memory card 60A is electrically connected to a circuit board (not shown) provided in the camera 10. Namely, when the operator pushes the card 60A into the card slot 18S with a given force, plural pins, which are provided in the end portion 60E of the memory card 60A, are connected to a connecting portion of the circuit board. Consequently, data can be mutually transmitted between the system control circuit 50 and the memory card 60A.

When installing the memory card 60A, as shown by a broken-line arrow OP3, the main card-cover 17A is opened by operating the lever 19 and the memory card 60A is installed into the card slot 18S. At this time, the accompanying cover 17B moves with the main card-cover 17A toward the back surface 10B, in a situation where the accompanying cover 17B is closing. After the memory card 60A is installed, the main card-cover 17A with the accompanying cover 17B is closed again. Consequently, the memory card 60A is perfectly covered by the total of card-cover 17. Note that, the size of the card slot 18S and the size of an inner space area SK, which is formed by closing the card-cover 17, are defined in accordance with the size of the memory card 60A. When a detaching button (not shown) is pushed, the memory card 60A is released from a connecting situation, and the operator detaches the memory card 60A from the camera 10.

On the other hand, when using the special card 60B, the special card 60B is installed into the card slot 18S by opening the accompanying cover 17B in a situation where the main card-cover 17A is closed (See FIG. 5). The special card 60B with the local communication function has an accompanying portion 60P with an aerial. The other portion of the special card 60B has a size that is generally the same as the size of the memory card 60A. The size of the opening-portion 17C corresponds to the size of the other portion of the special card 60B. Since the longitudinal length of the special cord 60B is longer than that of the memory card 60A, the special card 60B cannot be accommodated in the inner space area SK. In this embodiment, the operator touches the end portion 60F of the special card 60B on the covering-portion 17D in a situation where the main card-cover 17A is closed, and pushes the special card 60B toward the card slot 18S. The spring BN is elastically deformed by the pushing-force so that the accompanying cover 17B is pushed back toward the inner space area SK, namely, the accompanying cover 17B opens. When the special card 60B is installed into the card slot 18S, similarly to the memory card 60A, the end portion 60F is electrically connected to the circuit board. Note that, in FIG. 5, the spring BN is not drawn.

In this way, in the first embodiment, the card-cover 17, constructed of the main card-cover 17A and the accompanying cover 17B, is provided on the upper surface 10U of the camera. When using the memory card 60A, the main card cover 17A opens with the accompanying cover 17B by operating the lever 19. On the other hand, when using the special card 60B, the accompanying cover 17B opens while the main card-cover 17A is closed. Since the accompany cover 17B is opened while the main card-cover 17A is closed, portions other than the accompanying portion 60P are covered by the main card-cover 17A when installing the special card 60B. Thus, the special card 60B is protected from dust and water, and so on.

The accompanying cover 17B may open and close by using another type of elastic member in place of the spring BN. The accompanying cover may open toward an upper direction opposite to the inner space area SK. The accompanying cover 17B may be opened by using a button for opening the accompany cover 17B.

In this embodiment, the accompany cover 17B is attached to the main card-cover 17A, however, the accompanying cover 17B may be attached to the camera body.

The main accompanying cover 17A or the accompanying cover 17B may be opened and closed by using methods other than pivoting, such as a sliding. In this embodiment, the memory card 60A is applied to a mobile memory and the corresponding special card 60B is applied as a special mobile member, however, other types memory may be applied. In this case, the special mobile member is formed in accordance with the form of the mobile memory. Further, a card, which has a given function in place of the data-storing function and has a size that is the same as the size of the memory card 60A, may be used.

A single reflex type digital still camera, a camera using a film, or digital movie camera may be applied in place of the compact digital still camera.

Figure 6:
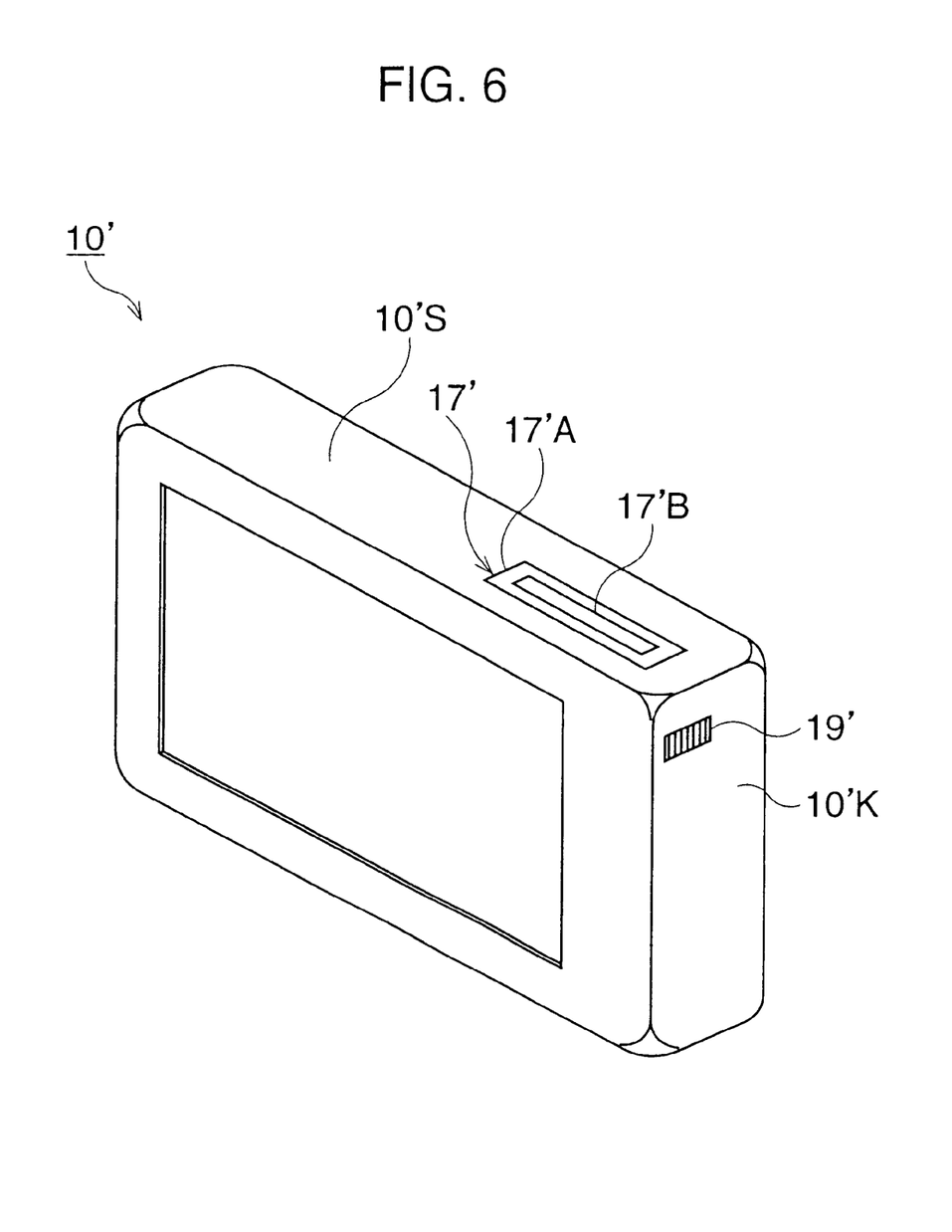
FIG. 6 is a perspective view of a PDA according to the second embodiment.

FIG. 6 is a perspective view of a PDA (Personal Digital Assistant) according to the second embodiment. A card-cover 17' with a main card-cover 17A and an accompanying cover 17'B is provided on a side surface 10'S of the PDA 10'. When using the memory card 60A, a lever 19' provided on a surface 10'K is operated so that the total card-cover 17' opens. On the other hand, when using the special card 60B, the special card 60B is pushed on the accompanying cover 17'B in a situation where the main card-cover 17'A is closed.

Finally, it will be understood by those skilled in the art that the foregoing description is of preferred embodiments of the device, and that various changes and modifications may be made to the present invention without departing from the spirit and scope thereof.

The present disclosure relates to subject matters contained in Japanese Patent Application No.2002-106349 (filed on Apr. 9, 2002) which is expressly incorporated herein, by reference, in its entirety.

What is claimed is:

1. A camera, in which a mobile memory is installed and a special mobile member with a special portion for accomplishing a special function different from a data-storing function, is installed, an installed portion of said special mobile member having a size that is the same as that of an installed portion of said mobile memory, said camera comprising:

an installing portion that has a first-opening for detachably installing said mobile memory and said special mobile member; and a covering member that is capable of covering said mobile memory installed in said first-opening, wherein said covering member comprises:

a first cover that has a second-opening having a size corresponding to said first-opening, and that opens and closes when installing said mobile memory; and a second cover that closes said second-opening and opens to install said special mobile member into said first-opening, said second cover opening in a situation where said first cover is closed, in accordance with an installing-action of said special mobile member, said second cover being attached to said first cover, said second cover being urged to close said second opening.

2. The camera of claim 1, wherein said first cover opens and closes by pivoting.

3. The camera of claim 1, wherein said second cover opens and closes by pivoting.

4. The camera of claim 1, wherein said second cover opens by a given force pushing said second cover, said given force occurring because of the installing-action.

5. The camera of claim 1, wherein said second cover opens toward said first-opening.

6. The camera of claim 1, wherein said second cover includes an elastic member that urges said second cover toward a closed-direction, said elastic member being subjected to elastic deformation in accordance with the installing-action.

7. The camera of claim 1, wherein said first-opening is formed on an upper portion of said camera.

8. The camera of claim 1, wherein said mobile memory is a card type memory, and said special mobile member is shaped like a card.

9. Mobile equipment, in which a mobile memory is installed and a special mobile member with a special portion for accomplishing a special function different from a data-storing function, is installed, an installed portion of said special mobile member having a size that is the same as that of an installed portion of said mobile memory, said mobile equipment comprising:

an installing portion that has a first-opening for detachably installing said mobile memory and said special mobile member; and a covering member that is capable of covering said mobile memory installed in said first-opening, wherein said covering member comprises:

a first cover that has a second-opening having a size corresponding to said first-opening, and that opens and closes when installing said mobile memory; and a second cover that closes said second-opening and opens to install said special mobile member into said first-opening, said second cover opening in a situation where said first cover is closed, in accordance with an installing-action of said special mobile member, said second cover being attached to said first cover, said second cover being urged to close said second opening.

10. Mobile equipment, in which a mobile memory is installed and a special mobile member with a special portion for accomplishing a special function different from a data-storing function, is installed, an installed portion of said special mobile member having a size that is the same as that of an installed portion of said mobile memory, said mobile equipment comprising:

an installing portion that has a first-opening for detachably installing said mobile memory and said special mobile member; and a covering member that is capable of covering said mobile memory installed in said first-opening, wherein said covering member comprises:

a first cover that has a second-opening having a size corresponding to said first-opening, and that opens and closes when installing said mobile memory; and a second cover that closes said second-opening and opens to install said special mobile member into said first-opening, said second cover opening in a situation where said first cover is closed, in accordance with an installing-action of said special mobile member, said second cover opening by a given force, that occurs because of the installing-action, that pushes said second cover, said second cover opening toward said first-opening.

11. A camera, in which a memory is installed and a special member with a special portion for accomplishing a special function different from a data-storing function, is installed, an installed portion of said special member having a size that is the same as that of an installed portion of said memory, said camera comprising:

an installing portion that has a first-opening for detachably installing the memory and the special member; and a covering member that is capable of covering the memory installed in said first-opening, wherein said covering member comprises:

a first cover that has a second-opening having a size corresponding to said first-opening, and that opens and closes when installing the memory; and a second cover that closes said second-opening and opens to install the special member into said first-opening, said second cover opening in a situation where said first cover is closed, in accordance with an installing-action of the special member, wherein said second cover opens by a given force pushing said second cover, said given force occurring because of the installing-action, said second cover opening toward said first-opening.

* * * * *